_3,775,539_
Patented Nov. 27, 1973

1

3,775,539
METHODS AND COMPOSITIONS FOR PREVENTING RETENTION OF PLACENTA FOLLOWING INDUCED PARTURITION IN CATTLE
Donal C. Anderson, Whakatane, New Zealand, assignor to Ciba-Geigy Corporation, Greenburgh, N.Y.
No Drawing. Filed Apr. 10, 1972, Ser. No. 242,815
Int. Cl. A61k *17/00*
U.S. Cl. 424—243                                6 Claims

ABSTRACT OF THE DISCLOSURE

Methods employing compositions containing a long-acting glucocorticoid, as for example, dexamethasone trimethylacetate, for preventing retention of fetal membranes following induced parturition in cattle.

DETAILED DISCLOSURE

This invention relates to induction of parturition in bovine animals and more particularly to methods and compositions for the prevention of retention of placenta following induced parturition in cattle. Still more particularly, this invention pertains to methods for preventing the undesirable side-effect of retained placenta or fetal membranes in parturition induced cows by the use of certain synthetic glucocorticoids.

Synthetic corticosteroids, such as prednisolone, dexamethasone, flumethasone, triamcinolone acetonide, dexamethasone trimethyl acetate, etc., have been widely used in the veterinary field as anti-inflammatory agents and for the treatment of bovine ketosis. These compounds have been classified according to the relative duration of therapeutic effect into short-acting and long-acting corticosteroids, the former being exemplified by prednisolone and dexamethasone and the latter, by triamcinolone acetonide and dexamethasone trimethylacetate. Short-acting glucocorticoids have recently been found effective also for parturition induction in farm animals. (Adams, The Elective Induction of Labor and Parturition in Cattle, J.A.V.M.A., 154 (3), 251–65, 1969 and Adams et al., The Elective Induction of Parturition in Cattle, Sheep and Rabbits, J.A.V.M.A., 154 (11), 1396–97, 1969.) In cattle, for instance, calving could be advanced during the last three to four weeks of gestation by an intramuscular injection of 20 mg. of dexamethasone whereupon parturition occurred within 40 to 50 hours. Glucocorticoid-induced parturition was then heralded by investigators and veterinarians in New Zealand, Australia, the United States and South Africa as a highly useful tool in animal hubsandry and the dairy and beef industry.

However, an extremely high incidence of retained fetal membranes was a consistent and serious drawback. More specifically, in practicing parturition induction in cattle by employing short-acting glucocorticoids, it has been found that in almost all cases the fetal membranes were retained with resultant serious metritis problems, e.g., purulent metritis or endometritis. Also, massive outbreaks of milk fever were encountered in this practice. Furthermore, in practicing such parturition induction the rate of success has been found to be most erratic and unpredictable with a failure rate of up to 90%, that is, parturition or calving failed to occur within two to three days which is the normal period within which short-acting glucocorticoids induce parturition and the treated cows calved after their normal gestation period as though no induction had been attempted. These and other undesirable side-effects and serious drawbacks existed even if parturition induction was practiced at a relatively late stage of pregnancy, i.e., in the last month of gestation.

These problems and complications have been recognized by the United States Food and Drug Administration because they insist on a label warning in connection with the sale of glucocorticoids for the treatment of inflammatory conditions and bovine ketosis to the effects that "corticosteroids administered orally or parenterally to animals may induce the first stage of parturition when administered during the last trimester of pregnancy and may precipitate premature parturition followed by dystocia, fetal death, retained placenta and metritis."

However, parturition induction in cattle presents great economic incentives and significant economic benefits and advantages would accrue if bovine parturition induction without the above-mentioned undesirable side-effects and serious problems were possible. Accordingly, it is a major object of this invention to overcome these side-effects and problems by providing improved methods and compositions for parturition induction in cattle. Another important object of this invention is to induce parturition in cows which otherwise approximates natural birth and has no adverse effect on the calving process and the cow's health, lactation and fertility. Yet another object is to induce parturition in cattle as early as two months or more before normal birth without serious side-effects and complications. Other objects will become apparent from the following disclosure.

Surprisingly and unexpectedly, it has now been found that the above-mentioned objects can be accomplished by employing certain long-acting glucocorticoids (hereinafter parturition-inducing agents) which posses the unique and unexpected ability to induce parturition or advance calving very consistently and without the undesirable side-effects, such as, in particularly, retained fetal membranes which commonly accompany the administration of short-acting glucocorticoids. In greater detail, this new technique for bovine parturition induction substantially without retention of placenta or without any increase in the incidence of retention of placenta involves the parenteral administration of a parturition inducing agent as for example, preferably dexamethasone - 21 - trimethylacetate (21 - trimethylacetate of $\Delta^{1,4}$-16α-methyl-9α-fluoro-pregnadiene - 11β:17α:21-triol-3:20-dione or 16α-methyl-9α-fluoroprednisolone trimethylacetate, hereinafter "dexamethasone trimethylacetate" which had heretofore been known as a highly active antiinflammatory glucocorticoid with protracted effects.

According to the concept of this invention, dexamethasone trimethylacetate can be parenterally administered to cows, at least about 220 days pregnant, i.e., within eight weeks or less of natural calving. There is thus a potential shortening of the pregnancy by some sixty to seventy days, which represents a very significant economic benefit and advantage especially in the dairy industry as will be seen in greater detail below. It will be appreciated, of course, by those skilled in the art that fetal viability may decrease with the degree of prematurity and where a high degree of fetal viability is desired, as, for instance, in the beef industry, parturition induction attempts are preferably delayed until four to six weeks before natural calving or at least about 240 days of pregnancy. In the dairy industry, on the other hand, where fetal viability is not as critical, parturition may be induced earlier, as pointed out above.

The effectiveness of the induction of parturition is also affected by the timing of the induction. But the failure rate with inductions which occur within four to six weeks before natural parturition is only about 5% which contrasts very favorably with the erratic rate for the short-acting glucocorticoids even when they are used, as they must be, in the last month of gestation. After administration of the parturition inducing agent, the treated cows generally calve in about one to three weeks and on average in about eleven to thirteen days. The period between the administration of the parturition inducing agent and actual parturition is referred to as latent period. The latent period for short-acting glucocorticoids, in contrast, is generally about two to three days. The latent period, it has been found, tends to be longer the earlier in the gestation period parturition induction attempts are made. For some reason which is not apparent, it has also been found that the latent period is somewhat longer earlier in the spring season. This is significant in terms of the incidence of fetal death for the incidence of fetal death tends to be somewhat higher the longer the latent period.

According to the concept of this invention, the parturition inducing agent can be administered parenterally. Any of the various modes of parenteral administration can be employed. However, since it is important that the latent period be not shorter than about a week and preferably about two weeks, those modes of administration which do not facilitate a rapid uptake and quick absorption but rather have a depot effect and hence protracted and prolonged action are preferred, as for example, intramuscular and subcutaneous injections. Conversely, intraperitoneal and intravenous injections may result in a too rapid absorption of the parturition inducing agent.

Since, as is well established, the impetus and stimulus for parturition comes from the calf rather than the cow, intrafetal administration may be particularly desirable even though it is not too easy to perform and requires a certain expertise and very sterile conditions. Intrafetal administration is accordingly in accord with the concept of this invention and hence within the scope of this invention.

Moreover, administration by way of implantation of e.g., a tablet or some other equivalent dosage unit form may also be a highly advantageous mode of administration because of the obvious and desirable depot effect which is therefore also in accord with the inventive concept and within the scope of this invention.

Lastly, it is entirely feasible to employ an intramammary infusion and to administer the parturition inducing agent orally.

According to the concept of this invention the effective dosage of parturition inducing agent can range between about 10 and 60 mg. Actual dosages used in several series of experiments were 10, 20, 25, 30 and 40 mg. all of which resulted in favorable responses. In preferred embodiments, the dosage employed is conveniently 20 or 40 mg. Although the choice of dosage is not specifically related to body size, it may be influenced as will be apparent to men skilled in the art by the size of the animal as well as its physical composition, the stage of gestation, the number of previous offsprings, etc. There is some evidence, however, that with a 20 mg. dose, the latent period is more of the order of 16 days, while it is more of the order of 10 days with a 40 mg. dose.

The dosage unit form for parenteral and in particular intramuscular administration will preferably be a microcrystalline suspension of the parturition inducing agent e.g., dexamethasone trimethylacetate, with the suspension containing the dexamethasone trimethylacetate in an isotonic and stabilized aqueous solution. It will be appreciated, of course, by men skilled in the art that any other equivalent formulation which does not result in rapid absorption and quick uptake but rather has slow depot releasing effects can be employed and is within the scope of this invention. The effectiveness in preventing retention of placenta following induced parturition in cows according to the concept of this invention was demonstrated and illustrated by results obtained in the following series of experiments.

EXAMPLE 1

To a group of cows in Herd No. 900 in the Bay of Plenty area of New Zealand, a dose of 20 mg. of dexamethasone trimethylacetate in the form of a 0.5% microcrystalline suspension was injected intramuscularly in the thigh or hip on Sept. 20, 1971. The following are the details:

| Cow No. | Weight, lbs. | Estimated calving date | Actual calving date | Latent period | Date 1st mating | Date conceived |
|---|---|---|---|---|---|---|
| 31 | 820 | 8th October | 3rd October | 13 | 23rd November | 23rd November |
| 41 | 1,035 | 19th October | 28th September | 8 | Not mated | -- |
| 43 | 960 | 16th September | 20th October | 30 | 12th November | 16th December |
| 69 | 800 | 16th October | 5th October | 15 | 7th December | 7th December |
| 103 | 890 | 29th October | 28th September | 8 | 21st November | Empty |
| 121 | 1,085 | 6th October | 1st October | 11 | 23rd November | 23rd November |
| 136 | 900 | 28th October | do | 11 | 10th November | 15th December |
| 146 | 735 | 29th October | 28th September | 8 | 7th November | 28th November |
| 164 | 670 | 10th October | 29th September | 9 | 13th November | Empty |
| 173 | 765 | 29th October | 4th October | 14 | 24th November | 24th November |
| 206 | 890 | 17th October | 5th October | 15 | 9th November | 30th November |

In all cases, the calves were born live and in none of the cases, except in the case of cow No. 41, was the placenta retained.

EXAMPLE 2

To three groups of Jersey and Friesian cross-cows at the Ruakura Animal Research Station in New Zealand, consisting of 6, 5 and 6 animals each and weighing about 600 to 1000 pounds, doses of 10 mg., 20 mg. and 40 mg. of dexamethasone trimethylacetate in the form of a 0.5% microcrystalline suspension were given by one intramuscular injection in the thigh or hip. The following are the experimental details:

| Cow No. | Weight, lbs. | Date treated | Date due | Actual calving | Latent period |
|---|---|---|---|---|---|
| 10 mg. dose (2 cc.): | | | | | |
| 444 | ¹1,010 | 9/3 | 9/19 | 9/14 | 11 |
| 928 | ¹681 | 9/3 | 10/2 | 9/17 | 14 |
| 460 | ¹964 | 9/3 | 10/1 | 9/29 | 26 |
| 861 | 864 | 8/27 | 9/26 | 9/16 | 21 |
| 152 | 512 | 8/30 | 10/6 | 9/26 | 27 |
| 370 ² | 893 | 8/30 | 10/5 | 9/21 | 22 |
| 20 mg. dose (4 cc.): | | | | | |
| 452 | ¹1,010 | 9/3 | 10/7 | 9/20 | 17 |
| 129 | 601 | 8/27 | 9/27 | 9/10 | 15 |
| 567 | 1,028 | 8/27 | 9/24 | 9/7 | 12 |
| 977 | 772 | 8/30 | 9/25 | 9/15 | 16 |
| 6133 ² | 813 | 8/30 | 10/6 | 9/24 | 25 |
| 40 mg. dose (8 cc.): | | | | | |
| 046 | ¹687 | 9/3 | 9/26 | 9/13 | 10 |
| 037 | ¹594 | 9/3 | 10/10 | 9/12 | 9 |
| 741 | ¹821 | 9/3 | 10/7 | 9/(5 | 12 |
| 914 | 896 | 8/27 | 9/24 | 9/5 | 10 |
| 7173 | 945 | 8/27 | 9/22 | 9/6 | 11 |
| 782 | 814 | 8/30 | 10/10 | 9/8 | 9 |

¹ Weighed on 9/8, all others were weighed on 9/1. All dates are in 1971.
² Calves were dead.

NOTE.—There was no case of retention of placenta.

In the above experiments as well as in thousands of similar experiments conducted in New Zealand and Australia, early parturition or calving was successfully induced (except in two cases where however subsequent investigation revealed the presence of a mummified fetus in the uterus) and in none of them was there any higher than normal incidence of retained fetal membranes or placenta, normal incidence being about 1%.

In contrast thereto, in similar parturition induction experiments where a short-acting dexamethasone formulation was used, parturition was induced in about two or three days, the induction success rate was highly erratic and the incidence of retention of placenta and of milk fever extremely high.

In addition, the parturition induced with dexamethasone trimethylacetate approximated natural birth and had no adverse effect on the calving process nor on the cow's health, lactation and fertility. As regards the calving process itself, there was no higher than normal incidence of dystocia. With respect to the general health of the cows there was no increased incidence of such metabolic disorders as hypocalcaemia (milk fever) and hypomagnesaemia (gras tetany) and the cows were otherwise in good health and condition.

With respect to lactation, the longer the period between treatment and calving which elapses when dexamethasone trimethylacetate is used as parturition inducing agent, seems to allow better preparation for lactation by the cow. Thus, milk and butterfat production appears to be at least normal. However, in another sense there is increased milk production. Typically, in a 365-day cycle, U.S. dairy cows are milked for 305 days and are dry for 60 days. Through the induction of early parturition, the dairyman can increase the number of milk production days in a year.

Likewise, the use of a long-acting parturition-inducing agent does not effect subsequent fertility of the cow and in at least one instance one cow has been induced three times successively and successfully. As regards calf viability, the calves which are born, though they are somewhat underweight are capable of survival and can usually be reared without great difficulty.

These findings and observations translate into tremendous benefits to the dairy and beef industry and especially to the farmer. More specifically, early parturition induction is particularly useful if the feed supplies are seasonal or if the management of the herd is made difficult by late births. An example is the situation in New Zealand where calving in milking herds is undesirable after October 1. Also, the rearing of calves born late is more problematic. Furthermore, first heifers and cows which have difficulties and traumas in calving can be subjected to early parturition induction in accordance with this invention which is a further obvious economic advantage.

Apart from its function as a management tool in animal husbandry and apart from the significant economic benefits, early parturition induction may also and secondarily be resorted to for medical reasons, e.g. to terminate gestations which have run too far over their time, to control fetal development where gross fetal oversize could be expected to cause dystocia at full term parturition, in cases of acute and chronic traumatic reticulitis, circulatory incompetence with bronchial pneumonia, pregnancy toxemia, amniotic dropsy (hydrops), kidney diseases, fractures etc.

While the invention has been illustrated and its effectiveness demonstrated by particular reference to dexamethasone trimethylacetate as parturition-inducing agent and while dexamethasone trimethylacetate represents the preferred parturition-inducing agent, it has also been found that other similarly active synthetic glucocorticoids can be employed in the practice of this invention provided, of course, that they exhibit slow and long lasting effects and can thus be classified as long-lasting glucocorticoids and are not administered in a vehicle or by way of a mode of administration which facilitates rapid uptake by the bloodstream or rapid transfer from the depot to the bloodstream. Other glucocorticoids, even though they may inherently not possess long-lasting properties can also be employed if either the vehicle or the mode of administration or both are designed to achieve a long-lasting depot effect and a latent period of at least a week and usually about two weeks is obtained.

Examples of such other long-lasting glucocorticoids exhibiting depot effects are the congener esters of dexamethasone trimethylacetate described and claimed in U.S. Pat. No. 3,375,261. Moreover, further examples of effective glucocorticoid-21 - esters are dexamethasone-21-isonicotinate, dexamethasone-21-cyclohexylacetate, dexamethasone-17,21-dipropionate, etc. Still further examples are the 21-esters of triamcinolone and the acetonides thereof.

Dexamethasone, betamethasone and particularly flumethasone as well as triamcinolone, triamcinolone acetonide and other glucocorticoids themselves may also be used provided, of course, that they are employed in a way that is designed to achieve a depot effect and long-lasting action and hence a latent period of about one to three weeks.

In fact, a number of parturition induction experiments have already been carried out without increased incidence of retention of placenta with dexamethasone-21-isonicotinate, triamcinolone acetonide, and also with flumethasone ($6\alpha,9\alpha$,difluoro-$16\alpha$-methylprednisolone) where the vehicle was an isotonic aqueous suspension and the mode of administration intramuscular injection. All such long-lasting glucocorticoid substances and formulations are therefore within the scope of this invention.

What is claimed is:

1. A method of preventing retention of placenta otherwise caused by short-acting glucocorticoid induced parturition in cows which comprises parenterally administering to said cows, pregnant for at least about 220 days, 10 to 60 mg. of dexamethasone-21-trimethylacetate as a long-lasting parturition inducing glucocorticoid with parturition taking place after a latent period of at least seven days, thus potentially shortening pregnancy by sixty to seventy days.

2. A method according to claim 1 wherein the cows are pregnant for at least about 240 days.

3. A method according to claim 1 wherein 20 to 40 mg. of dexamethasone trimethylacetate is administered.

4. A method according to claim 1 wherein said parenteral administration is intramuscular injection.

5. A method according to claim 1 wherein said latent period is about two weeks.

6. In a method of bovine parturition induction with synthetic glucocorticoids the improvement which consists in parenterally administering to cows, pregnant for at least 220 days, 10 to 60 mg. of dexamethasone-21-trimethylacetate as a long-lasting depot like glucocorticoid and parturition inducing agent whereby parturition without retention of placenta otherwise caused by short-acting glucocorticoids takes place within about one to three weeks.

References Cited

Adams, J.A.V.M.A. 154(3): 251–65 (1969), The Effective Induction of Labor and Parturition in Cattle.

Adams et al., J.A.V.M.A. 154(11): 1396–97 (1969), The effective Induction of Parturition in Cattle, Sheep and Rabbits.

SHEP K. ROSE, Primary Examiner